No. 755,847. PATENTED MAR. 29, 1904.
A. CLARKSON.
ADJUSTABLE PIPE SUPPORTING BRACKET.
APPLICATION FILED MAY 1, 1903.
NO MODEL.
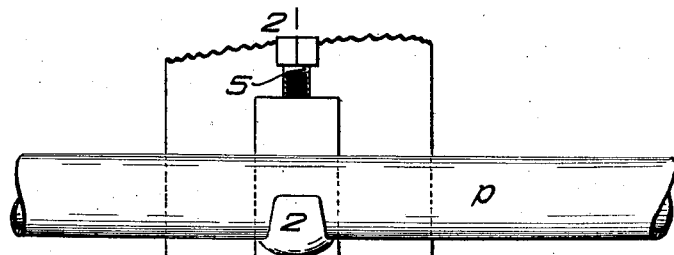
FIG. 1.
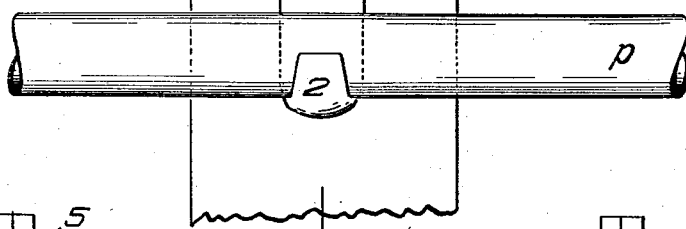
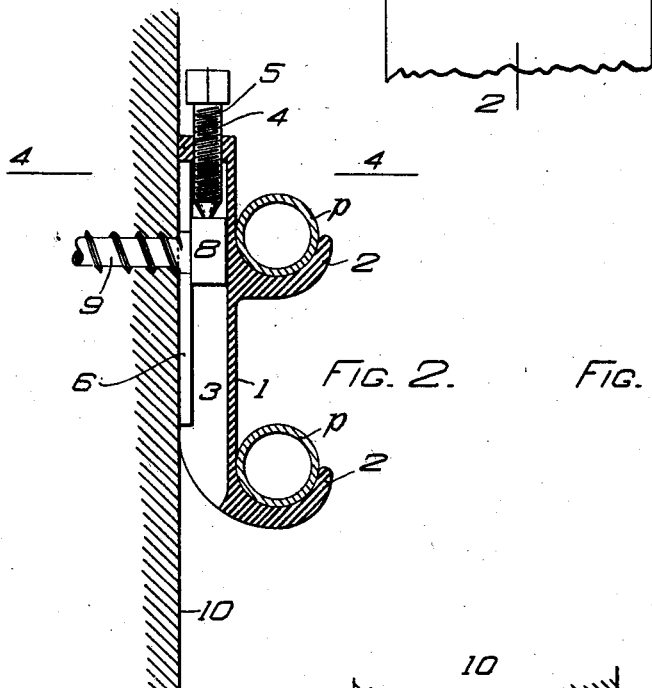
FIG. 2.
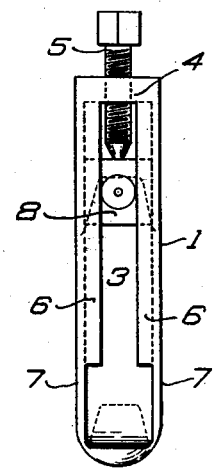
FIG. 3.
FIG. 4.
WITNESSES
W. E. Coveney.
E. A. Allen.
INVENTOR
Alfred Clarkson
by his attorney
Edward S. Beach.

No. 755,847. Patented March 29, 1904.

UNITED STATES PATENT OFFICE.

ALFRED CLARKSON, OF FALL RIVER, MASSACHUSETTS.

ADJUSTABLE PIPE-SUPPORTING BRACKET.

SPECIFICATION forming part of Letters Patent No. 755,847, dated March 29, 1904.

Application filed May 1, 1903. Serial No. 155,225. (No model.)

*To all whom it may concern:*

Be it known that I, ALFRED CLARKSON, a citizen of the United States, residing at Fall River, in the county of Bristol and State of Massachusetts, have invented certain new and useful Improvements in Adjustable Pipe-Supporting Brackets, of which the following is a specification, reference being had therein to the accompanying drawings.

Figure 1 is a front elevation showing one form of my pipe-supporting bracket in place on a portion of a building, such as a beam. Fig. 2 is a view, partly in section, at line 2 2 of Fig. 1. Fig. 3 is a rear view of the bracket detached. Fig. 4 is a transverse section at a line corresponding to line 4 4 of Fig. 2.

In many mills humidifier and other pipes require to be held horizontally. When for any reason—for example, settling of foundations or sagging of beams to which the pipe-supports are connected or sagging of the pipe-supports on the beams in consequence of jar or vibration—the pipes get out of horizontal position, they have to be adjusted into horizontal position by proper readjustment of their supports or otherwise.

The object of my invention is to produce a strong, durable, and readily-adjusted pipe-supporting bracket.

In the drawings, 1 is the bracket-body, provided in this form with a plurality of outwardly and upwardly extending hooks 2, in which the pipes $p$ $p$ are held in a horizontal position. The bracket-body is provided with a guideway, into which the flanged head 8 of the supporting-screw 9 is adapted to slide, said guideway comprising a groove 3, extending lengthwise of the bracket-body, and inwardly-extending flanges 6, partly covering said groove. Flanges 6 extend longitudinally for only a part of the length of groove 3, so as to leave a space between the sides 7 7 of the bracket-body and between the ends of flanges 6 6 and an end of the groove 3 for the passage of the head 8 into the groove. By adjusting screw 5, the inner end of which impinges on head 8, the position of the bracket on the wall or post 10, which is entered by the screw or fastener 9, is readily changed to effect the desired leveling of the pipes $p$ $p$. Head 8 is preferably square, so that its upper side may afford a good bearing for the set-screw 5 and its sides be in guiding contact with the inner side walls of groove 3.

What I claim is—

The combination of a bracket-fastener, having a head at its outer end, with a pipe-supporting bracket which is formed, on its front side, with a pipe-support, and, on its rear side, with a lengthwise-extending guideway for said fastener, the guideway comprising a groove and inwardly-extending flanges partly covering said groove and overlapping the head of the fastener, a portion of the fastener passing between the inner edges of said flanges; the bracket being formed with a space to permit the entrance of the fastener-head into the said guideway, and the bracket having a transverse bridge-piece formed with an opening for a set-screw which passes through said opening into the guideway to engage the fastener-head therein; and a set-screw.

In testimony whereof I affix my signature in presence of two witnesses.

ALFRED CLARKSON.

Witnesses:
W. E. COVENEY,
E. A. ALLEN.